United States Patent [19]

Vezain

[11] Patent Number: 5,071,254

[45] Date of Patent: Dec. 10, 1991

[54] DEVICE FOR GUIDING AND CONTROLLING DISPLACEMENT OF A MOBILE MEMBER RELATIVE TO A FIXED MEMBER PARALLEL TO A TRANSLATION AXIS AND OPTICAL INSTRUMENT COMPRISING SAME

[75] Inventor: Gérard Vezain, Mandelieu, France

[73] Assignee: Aerospatiale Societe Nationale Industrielle, Paris, France

[21] Appl. No.: 536,121

[22] Filed: Jun. 11, 1990

[30] Foreign Application Priority Data

Jun. 12, 1989 [FR] France ............................ 89 07738

[51] Int. Cl.⁵ .............................................. G02B 7/02
[52] U.S. Cl. .................................... 359/819; 359/823; 369/44.16
[58] Field of Search ........................ 350/252, 247, 255; 369/44.16; 248/585, 592, 610, 693

[56] References Cited

U.S. PATENT DOCUMENTS

| | | | |
|---|---|---|---|
| 4,030,815 | 6/1977 | Andrewski et al. | 350/255 |
| 4,449,213 | 5/1984 | Noborimoto et al. | 369/44.16 |
| 4,614,403 | 9/1986 | Kersten et al. | |
| 4,615,585 | 10/1986 | Van Sluys et al. | 350/255 |
| 4,882,723 | 11/1989 | Van Rosemalen | 350/255 |

FOREIGN PATENT DOCUMENTS 0176127 4/1986 European Pat. Off. .
88/04066 6/1988 PCT Int'l Appl. .
2090038 6/1982 United Kingdom .

Primary Examiner—Loha Ben
Attorney, Agent, or Firm—Browdy and Neimark

[57] ABSTRACT

A device for guiding and controlling displacement of a mobile member relative to a fixed member parallel to a translation axis comprises at least one pair of parallel flexible flat plates. These plates are transverse to and spaced along the axis, one end of each plate being rigidly attached to the mobile member and the other end of each plate being rigidly attached to the fixed member. The rigidly attached parts of each plate are at the same distance from the axis. A transverse extension on the mobile member extends approximately parallel to the plates towards the fixed member, over at least half the transverse distance between the respective parts of the plates rigidly fixed to the mobile member and the fixed member. An actuator applies a force to this extension parallel to the axis at a point substantially equidistant transversely from the respective parts of the plates rigidly fixed to the mobile member and the fixed member.

9 Claims, 2 Drawing Sheets

5,071,254

DEVICE FOR GUIDING AND CONTROLLING DISPLACEMENT OF A MOBILE MEMBER RELATIVE TO A FIXED MEMBER PARALLEL TO A TRANSLATION AXIS AND OPTICAL INSTRUMENT COMPRISING SAME

BACKGROUND OF THE INVENTION

1. Field of the Invention

The present invention concerns controlling and guiding the displacement of a mobile member parallel to an axis and minimizing any unwanted tilting of the mobile member relative to the axis.

2. Description of the Prior Art

The invention is particularly, but not exclusively, directed to guiding and controlling the movement of a lens within a focussing mechanism of optical instruments or telescopes; in such optical instruments it is necessary to move one or more lenses to achieve optimum focussing and this displacement must be exactly aligned with the direction of the optical axis on which the lens is disposed.

The quality of the image formed by the optical instrument in question depends on the quality of the lenses and also on how accurately they are positioned on the optical path. It is therefore essential to guide and control the displacement of the lens in such a way as to minimize positioning defects.

There are two types of lens positioning defects, which may be encountered in combination:

firstly there is eccentricity, that is to say a parallax defect between the lens axis and the axis of the optical path of the radiation passing through the lens;

then there is tilting, that is to say an angular offset between the axis of the lens and the optical axis.

The latter type of defect is usually more prejudicial to image quality.

The invention is mainly directed to minimizing or even eliminating this latter type of defect while minimizing eccentricity.

The invention is directed to obtaining the aforementioned result in a simple, reliable, inexpensive and compact manner by using mechanical guidance free of play and friction and requiring force to be applied at one point only to carry out the displacement.

SUMMARY OF THE INVENTION

In one aspect the invention consists of a device for guiding and controlling displacement of a mobile member relative to a fixed member parallel to a translation axis, the device comprising at least one pair of parallel flexible flat plates transverse to and spaced along the said axis, one end part of each plate being rigidly attached to the mobile member at a same first distance from the axis and the other end part of each plate being rigidly attached to the fixed member at a same second distance from the axis, a transverse extension on the mobile member extending approximately parallel to the plates towards the fixed member over at least half the transverse distance between the respective parts of the plates rigidly fixed to the mobile member and the fixed member, and an actuator adapted to apply a force to the extension parallel to the axis at a point substantially equidistant transversely from the respective parts of the plates rigidly fixed to the mobile member and the fixed member.

According to preferred features of the invention, some of which may be combined with each other:

the transverse extension of the mobile member is to a same side of the flexible plates in the direction parallel to the axis being that the transverse extension is longitudinally outside the pair of flexible plates and not between these plates;

the actuator comprises a plunger in simple bearing engagement with the extension, parallel to the axis, and the flexible plates are resilient;

the transverse extension of the mobile member is located, in the direction parallel to the axis, between the actuator and the pair of flexible plates;

the translation axis is horizontal and the mobile member is suspended from the fixed member by the plates which are symmetrical relative to a vertical plane perpendicular to the horizontal translation axis.

In another aspect the invention consists of an optical instrument comprising an optical member mobile relative to a fixed member, parallel to translation axis at least one pair of parallel flexible flat plates transverse to and spaced along the axis, one end part of each plate being rigidly attached to the mobile member at a same first distance from the axis and the other end part of each plate being rigidly attached to the fixed member at a same second distance from the axis, rigidly attached parts of each plate being at the same, a transverse extension on the mobile member extending approximately parallel to the plates towards the fixed member over at least half the transverse distance between the respective parts of the plates rigidly fixed to the mobile member and the fixed member, and an actuator adapted to apply a force to the extension parallel to the axis at a point substantially equidistant transversely from the respective parts of the plates rigidly fixed to the mobile member and the fixed member.

According to other features of the invention:

the mobile optical member is a ring in which a lens is mounted;

the translation axis is horizontal and the ring is disposed in a vertical plane;

the ring is linked to the frame by the single pair of flexible plates symmetrical relative to a vertical plane perpendicular to the translation axis.

Objects, characteristics and advantages of the invention emerge from the following description given by way of non-limiting example only with reference to the appended diagrammatic drawings.

DETAILED DESCRIPTION OF THE INVENTION

Figure 2:
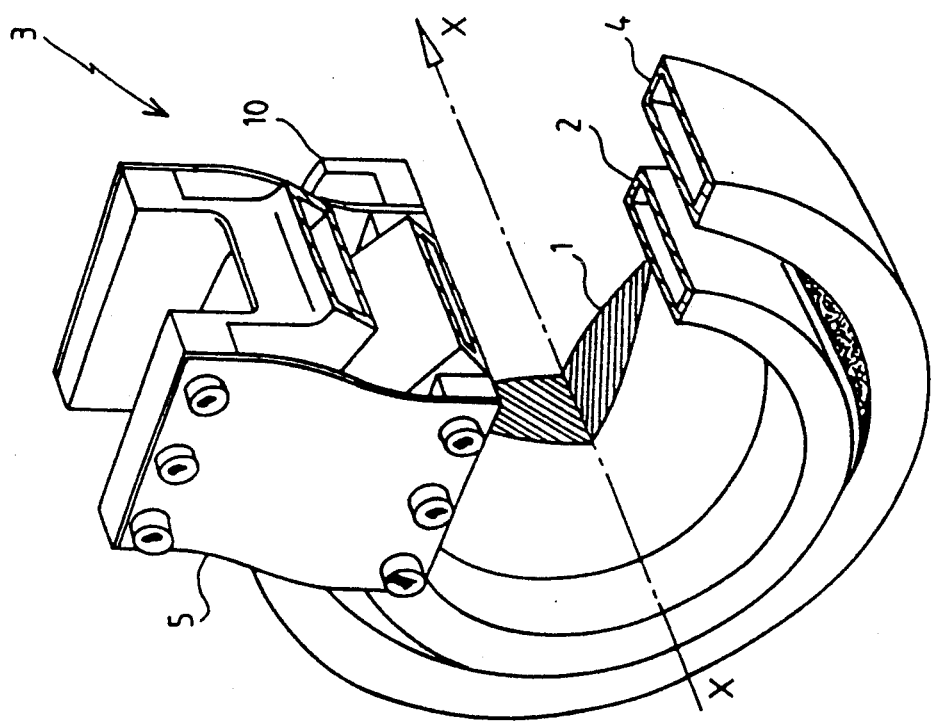
FIG. 2 is another view of this device, in a translation configuration.
Figure 1:
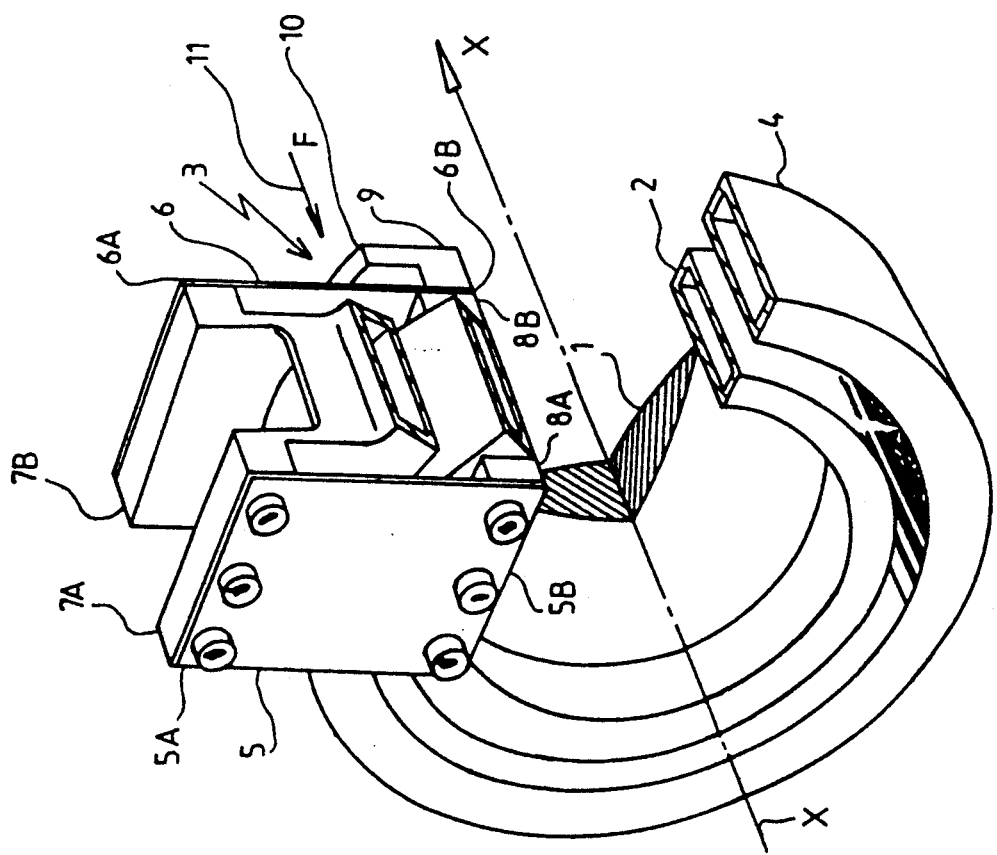
FIG. 1 is a partially cut away perspective view of a device for guiding and controlling the displacement of a mobile optical member seen in a rest configuration.
Figure 3:
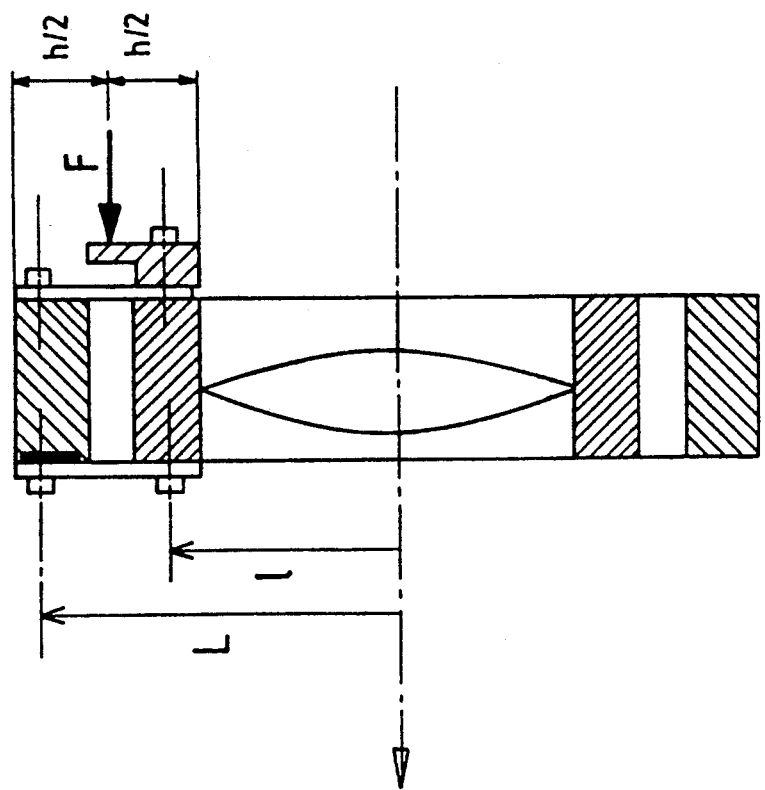
FIG. 3 is a view of this device in axial cross-section.

FIGS. 1 through 3 show a lens 1 that is required to be displaced parallel to an optical axis X—X of an optical instrument not shown in detail here but of conventional known structure. It might be a focussing mechanism.

The lens 1 is held at its edge in a ring or annular shell 2 coupled by a device 3 to a member that is fixed relative to the optical instrument, materially represented here by a shell 4 concentric with the shell 2 which will therefore be referred to as the inner mobile shell while the member 4 will be referred to as the outer fixed shell.

The device 3 alone guides and controls displacement of the mobile assembly 1 +2 parallel to the optical axis X—X of the optical instrument.

Of course, the axis of the lens is in principle coincident with the aforementioned optical axis.

The device 3 comprises two parallel flexible flat plates 5 and 6 disposed transversely to the optical axis X—X. These plates are advantageously able to flex in a resilient way.

The plates are rectangular in shape, approximately square in this embodiment. They are identical.

The ends 5A and 6A, and 5B and 6B of the plates are rigidly attached to the outer shell 4 and the inner shell 2, respectively, in this embodiment by adhesive bonding and/or bolting. The ends 5A, 5B, 6A and 6B therefore constitute fixed areas, or embedding areas, the same distance apart.

To facilitate attaching the flexible plates to the shells despite the curvature of the latter, the shells are provided with fixing bars 7A, 7B on the outer shell and 8A, 8B on the inner shell. In this embodiment these bars are in one piece with the shells.

The fixing bars 7A, 7B, 8A, 8B project axially relative to the shells which increases the potential axial displacement of the mobile assembly 1 +2 relative to the outer shell by virtue of flexing of the flexible plates.

Note that the fixed parts of the ends of the plates 5 and 6, here situated on opposite sides of the shells 2 and 4, are at respective equal distances from the axis X—X: this distance is denoted l for the ends 5B and 6B and L for the ends 5A and 6A.

Fixed to one side of the inner shell 2 is an L-shaped bar 9 comprising a flange 10 transverse to the optical axis X—X extending away from the axis X—X towards the body of the instrument of which the outer shell forms part.

Any appropriate known type of actuator 11, schematically represented here by an arrow F, carried directly or indirectly by the body of the optical instrument is adapted to act on this flange 10 parallel to the optical axis.

The area on the flange 10 on which the actuator (for example a mobile finger or plunger that the actuator comprises) acts on is, in accordance with the invention, equidistant transversely to the optical axis between the level l of the bars 8A, 8B and that L of the bars 7A and 7B.

Figure 4:
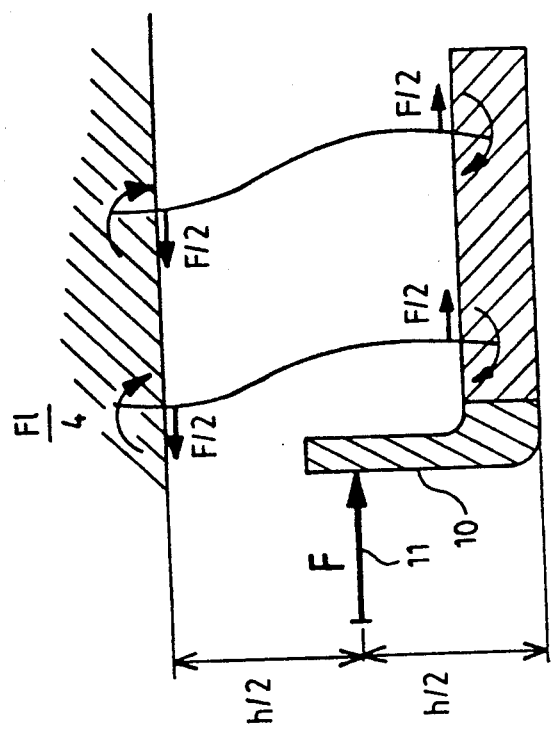
FIG. 4 shows a detail from FIG. 3 indicating the applied forces and torques.

As schematically represented in FIGS. 3 and 4, the actuator 11 is preferably in simple bearing engagement with the flange 10, acting against the elastic return force due to the resilient flexibility of the flexible plates.

The guidance offered by the invention is achieved from this flexibility parallel to X—X combined with the rigidity in shear in their plane of the pair of flexible plates rigidly fixed at their ends to the fixed member and to the mobile member of the optical instrument, respectively.

The application of a force to the inner shell 2 substantially in line with the fixing bars 8A and 8B can be shown to induce a tension force on the immediately adjacent plate and a compression force on the other plate. This difference in the loadings on the two plates, given the elasticity in tension/compression of the blades in their own plane, tends to tilt the axis of the lens relative to the optical axis.

On the other hand, if the thrust applied by the actuator is, as shown here, centered between the fixing bars 7A and 7B on the one hand and 8A and 8B on the other hand, reference to FIG. 4 shows that the two plates function in exactly the same way (without tension or compression) and so guide displacement of the mobile assembly 1 +2 with no tilting relative to the optical axis. It can be shown that the forces in each rigid fixing area can be reduced to a force F/2 parallel to the X—X axis and a torque Fh/4 where h is the distance between the rigidly fixed areas.

Because they flex, the flexible plates 5 and 6 move the bars 8A and 8B slightly away from the optical axis X—X, so inducing some eccentricity between the axis of the lens and the optical axis. This eccentricity can be kept at a very low level given that it is proportional to the amplitude of the displacement parallel to X—X (which is generally small, in practice less than 2 mm in conventional focussing mechanisms) and is in inverse proportion to the distance (L) between the X—X axis and the fixing bars 7A and 7B attached to the outer shell (which distance may be large especially if, as shown in FIGS. 1 through 3, the bars are radially offset outwardly relative to the outer shell 4).

It will be understood that, in accordance with the invention, the guidance is mechanical with no friction or play: it is achieved without recourse to any slideway or articulation.

This guidance is also isostatic, in other words in relation to interface forces it is insensitive to geometrical variations.

Finally, this form of guidance requires force to be applied at a single point to bring about the displacement without there being any need to synchronize multiple actuators.

By virtue of the aforementioned advantages, which confer upon the displacement guidance and control device great simplicity, great flexibility, compact overall dimensions and moderate weight, the invention is of particular benefit in controlling mobile optical assemblies of optical instruments mounted on satellites, for example camera lenses.

It goes without saying that the foregoing description has been given by way of non-limiting example only and that numerous variants may be proposed by those skilled in the art without departing from the scope of the invention.

I claim:

1. Device for guiding and controlling displacement of a mobile member relative to a fixed member parallel to a translation axis, the device comprising at least one pair of parallel flexible flat plates transverse to and spaced along said axis, one end part of each plate being rigidly attached to the mobile member at a same first distance from the axis and the other end part of each plate being rigidly attached to said fixed member at a same second distance from the axis, a tansverse extension on said mobile member extending approximately parallel to said plates and directed towards said fixed member over at least half a transverse distance between the respective end parts of said plates rigidly fixed to the mobile member and the fixed member, and an actuator adapted to apply a force to said extension parallel to said axis at a point substantially equidistant transversely from the respective end parts of said plates rigidly fixed to the mobile member and the fixed member.

2. Device according to claim 1, wherein said transverse extension of the mobile member is longitudinally outside to the same side of said flexible plates in the direction parallel to said axis.

3. Device according to claim 1, wherein said actuator comprises a plunger in simple bearing engagement with said extension, parallel to said axis, and said flexible plates are resilient.

4. Device according to claim 3, wherein said transverse extension of said mobile member is located, in the direction parallel to said axis, between said actuator and said pair of flexible plates.

5. Device according to claim 1, wherein said translation axis is horizontal and the mobile member is suspended from the fixed member by said plates which are vertical and each symmetrical relative to a vertical plane perpendicular to said horizontal translation axis.

6. Optical instrument comprising an optical member mobile relative to a fixed member parallel to a translation axis, at least one pair of parallel flexible flat plates transverse to and spaced along said axis, one end part of each plate being rigidly attached to the mobile member at a same first distance from the axis and the other end part of each plate being rigidly attached to the fixed member at a same second distance from the axis, a transverse extension on the mobile member extending approximately parallel to said plates and directed towards the fixed member over at least half a transverse distance between the respective end parts of said plates rigidly fixed to the mobile member and the fixed member, and an actuator adapted to apply a force to said extension parallel to said axis at a point substantially equidistant transversely from the respective end parts of said plates rigidly fixed to the mobile member and the fixed member.

7. Instrument according to claim 6, wherein said mobile optical member is a ring in which a lens is mounted.

8. Instrument according to claim 6, wherein said translation axis is horizontal and said ring is disposed in a vertical plane.

9. Instrument according to claim 8, wherein said ring is linked to the fixed member by a single pair of vertical flexible plates each symmetrical relative to a vertical plane perpendicular to said translation axis.

* * * * *